US009794322B2

United States Patent
Gibbons et al.

(10) Patent No.: US 9,794,322 B2
(45) Date of Patent: Oct. 17, 2017

(54) WEB BARCODE SCANNER

(71) Applicant: eBay Enterprise, Inc., King of Prussia, PA (US)

(72) Inventors: Brian J. Gibbons, Phoenixville, PA (US); Justin Szczurowski, Gilbertsville, PA (US)

(73) Assignee: Radial, Inc., King of Prussia, PA (US)

( * ) Notice: Subject to any disclaimer, the term of this patent is extended or adjusted under 35 U.S.C. 154(b) by 217 days.

(21) Appl. No.: 14/687,753

(22) Filed: Apr. 15, 2015

(65) Prior Publication Data

US 2016/0308932 A1 Oct. 20, 2016

(51) Int. Cl.
*H04L 29/08* (2006.01)
*G06K 7/14* (2006.01)
*G06F 17/30* (2006.01)
*H04M 1/2755* (2006.01)
*H04M 1/725* (2006.01)

(52) U.S. Cl.
CPC .............. *H04L 67/02* (2013.01); *G06F 17/30* (2013.01); *G06K 7/1443* (2013.01); *H04M 1/2755* (2013.01); *H04L 67/20* (2013.01); *H04M 1/72561* (2013.01)

(58) Field of Classification Search
CPC ........ H04L 67/02; H04L 67/20; G06K 7/1443
USPC ........ 709/203, 204, 205, 206, 207; 235/375, 235/462.01, 494
See application file for complete search history.

(56) References Cited

U.S. PATENT DOCUMENTS

| 8,708,224 B2* | 4/2014 | Boudville | G06F 17/30879 235/375 |
|---|---|---|---|
| 2004/0080530 A1* | 4/2004 | Lee | G06T 19/006 715/738 |
| 2007/0102521 A1* | 5/2007 | Petersson | G06Q 10/10 235/462.1 |
| 2009/0026269 A1 | 1/2009 | Connell, II et al. | |
| 2009/0212113 A1* | 8/2009 | Chiu | G06K 7/14 235/462.41 |

(Continued)

FOREIGN PATENT DOCUMENTS

WO WO-2016168663 A1 10/2016

OTHER PUBLICATIONS

"2D Barcode Image Decoding"—Lin et al, Hindawi Publishing Corporation, Nov. 2013 http://www.csie.ntu.edu.tw/~fuh/personal/2DBarcodeImageDecoding.pdf.*

(Continued)

*Primary Examiner* — Randy Scott
(74) *Attorney, Agent, or Firm* — Schwegman Lundberg & Woessner, P.A.

(57) ABSTRACT

In various example embodiments, a system and method for retrieving item identification information are presented. The system receives a selection request indicating selection of a user interface element from a client device and, based on the selection request, causes the client device to access an image capture application. The system receives encoded image data from the client device, decodes the image data to retrieve one or more optical machine-readable representations of data, and determines one or more items associated with the optical machine-readable representations of data. The system then causes presentation of item data representative of the one or more items at the client device.

20 Claims, 12 Drawing Sheets

(56) References Cited

U.S. PATENT DOCUMENTS

2014/0149191 A1    5/2014   Aguayo

OTHER PUBLICATIONS

"Digital Cellular Telecommunication System (Phase 2 +); Universal Mobile Telecommunications System (UMTS)", Global System for Mobile Communication, [retrieved on Jun. 10, 2016] Retrieved from the internet <URL:http://www.etsi.org/deliver/etsijs/126200_126299/126244/07.03.00_60/ts_126244v070300p.pdf>, (Jan. 2008), 51 pgs.

"International Application Serial No. PCT/US2016/027846, International Search Report mailed Jul. 15, 2016", 2 pgs.

"International Application Serial No. PCT/US2016/027846, Written Opinion mailed Jul. 15, 2016", 6 pgs.

\* cited by examiner

WEB BARCODE SCANNER

TECHNICAL FIELD

Embodiments of the present disclosure relate generally to data processing and, more particularly, but not by way of limitation, to capturing and transmitting optical machine-readable representations of data.

BACKGROUND

Conventionally, optical machine-readable representations of data, such as barcodes, have used specialized equipment to scan and determine data associated with the representation. Barcode scanners have been adopted in some mobile applications for mobile devices such as cellular telephones. These mobile applications are usually downloaded to a mobile device or portions are downloaded such that the application which functions as a native application on the mobile device. Mobile applications are generally trusted to allow a user to utilize hardware associated with the mobile device, such as cameras.

Electronic commerce businesses often use brick and mortar stores for store fulfillment. During store fulfillment at brick and mortar stores, store employees often walk the floor of the brick and mortar store to find various products for an order, scan the barcode for each product, and broadcast these barcodes to a warehouse system to assist in inventory management and update product supply lists. These brick and mortar stores often receive increased volume during common gift buying seasons such as broadly recognized holidays. Stores engaging in store fulfillment activities often bear the cost of hiring additional employees and purchasing additional hardware during busy periods. The investment of additional hardware may be unnecessary during other times of the year.

BRIEF DESCRIPTION OF THE DRAWINGS

Various ones of the appended drawings merely illustrate example embodiments of the present disclosure and cannot be considered as limiting its scope.

Figure 1:
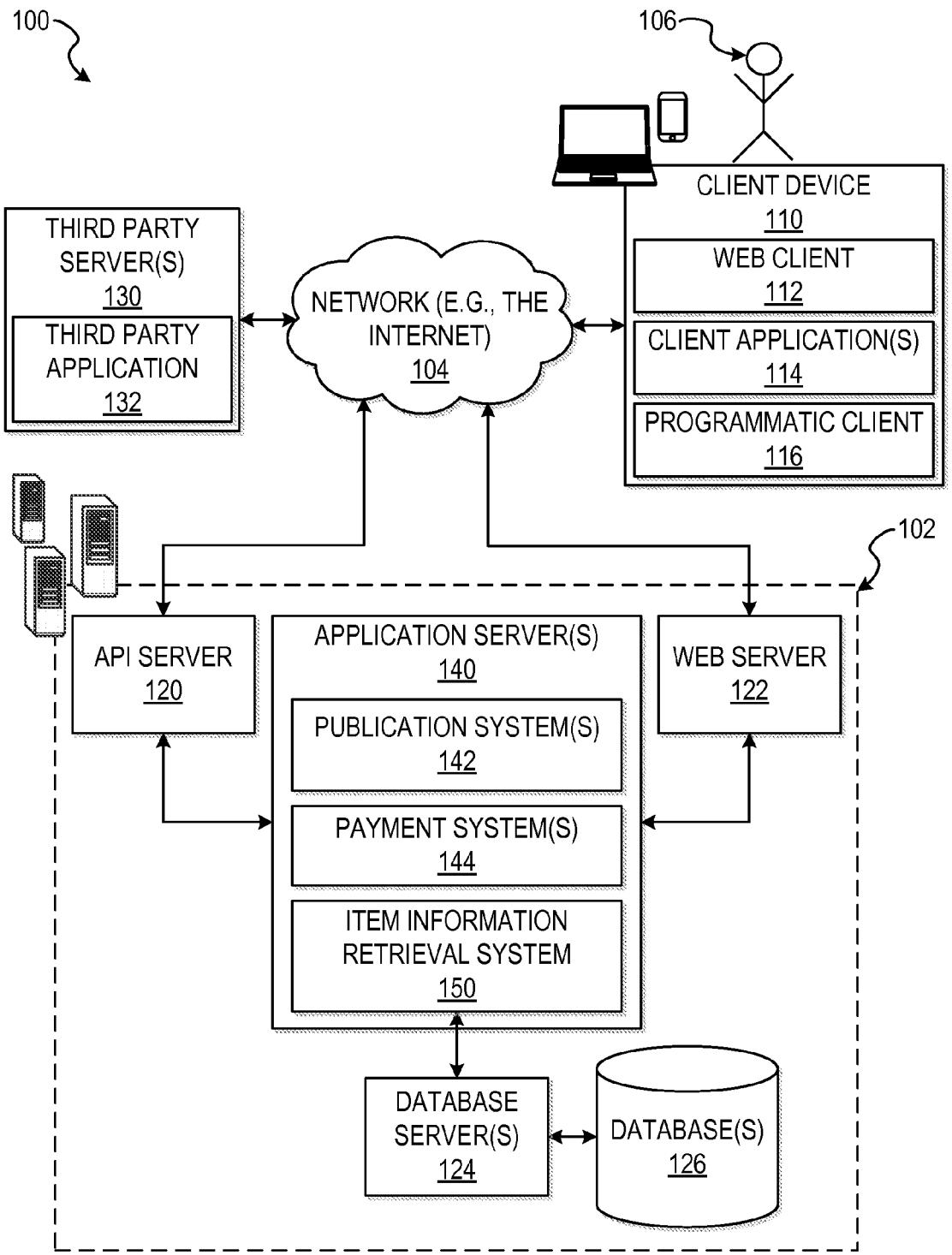
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, methods and systems for an item information retrieval system are presented. The item information retrieval system may enable a user of scanning and image capture sensors, devices, or equipment within a client device (e.g., a phone, smartphone, tablet device, etc.) to capture images of optical machine-readable representations of data (e.g., barcodes) and identify items based on the optical machine-readable representations of data. When brick and mortar stores or other facilities engaged in store fulfillment activities receive increased traffic or purchasing during high volume times of the year, the brick and mortar stores may hire additional employees to help with store fulfillment, shipping, and inventory management activities. In some embodiments, the item information retrieval system provides an alternative to investing in additional hardware for scanning of optical machine-readable representations of data such as barcodes. For example, seasonal employees may access the item information retrieval system via a client device (e.g., smartphone or tablet) already owned by the seasonal employee.

Once the item information retrieval system has been accessed by the client device, the seasonal employee can perform store fulfillment, inventory management, purchasing, and other activities without the need for specialized devices purchased by the employer (e.g., brick and mortar store). In some instances, a seasonal employee may access the item information retrieval system via a network associated with the brick and mortar store (e.g., an internal WiFi network) to communicate with inventory management systems (e.g., a vendor's warehouse web application internal to the store) of the store such as inventory management and tracking systems within a warehouse of the store.

In some embodiments, at least a portion of the item information retrieval system may be implemented in the form of a web application accessible by client devices.

Using the example of seasonal employees, the web application may be accessed over a store network by a client device owned by a seasonal employee. The item information retrieval system, implemented as a web application, may enable use of hardware and devices internal or connected to the client device and transmit captured images, including optical machine-readable representations of data, via API calls to modules within the item information retrieval system or third party services to identify the optical machine-readable representations of data. In some instances, one or more modules of the item information retrieval system or the third party service may digest or process the image and produce a barcode in numeric form. The modules or third party service may then process the barcode or transmit the barcode to an additional service, such as a UPC look-up service, to return item or product information. For example, the item or product information may include a product name, a type of product being scanned, and other identifying information.

In some embodiments, the item information retrieval system may also communicate the identification of the item or product to an inventory management system (e.g., a warehouse system of the brick and mortar store). In some embodiments, communicating the identification of the item or product may cause the inventory management system to increment a quantity of the item or product within the inventory management system. In some embodiments, the item information retrieval system may send a fulfillment indicator with or in addition to the identification of the item or product to the inventory management system. The fulfillment indicator may cause the inventory management system to increment the quantity. In some instances, in addition to incrementing the quantity, the fulfillment indicator may also cause the inventory management system to order additional stock of the item or product once the quantity falls below a predetermined threshold. Further, in some instances, the fulfillment indicator may cause the inventory management system to update an electronic commerce website to indicate a lack of inventory if the fulfillment indicator causes the inventory management system to increment to a quantity below a predetermined threshold (e.g., zero).

With reference to FIG. 1, an example embodiment of high-level client-server-based network architecture 100 is shown. A networked system 102, in the example forms of a network-based marketplace or payment system, provides server-side functionality via a network 104 (e.g., the Internet or wide area network (WAN)) to one or more client device 110. FIG. 1 illustrates, for example, a web client 112 (e.g., a browser, such as the Internet Explorer® browser developed by Microsoft® Corporation of Redmond, Wash.), client applications 114, and a programmatic client 116 executing on the client device 110.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screen, accelerometer, gyroscope, camera, microphone, global positioning system (GPS) device, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with the client device 110. In embodiments, the user 106 is not part of the network architecture 100, but may interact with the network architecture 100 via the client device 110 or another means. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application server 140. The application server(s) 140 may host one or more publication system 142 and payment system 144, each of which may comprise one or more modules or applications and each of which may be embodied as hardware, software, firmware, or any combination thereof. The application server(s) 140 are, in turn, shown to be coupled to one or more database server 124 that facilitate access to one or more information storage repositories or database(s) 126. In an example embodiment, the database(s) 126 are storage devices that store information to be posted (e.g., publications or listings) to the publication system(s) 142. The database(s) 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system(s) 142 may provide a number of publication functions and services to users 106 that access the networked system 102. The payment system(s) 144 may likewise provide a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some embodiments, the payment system(s) 144 may form part of the publication system(s) 142.

The item information retrieval system 150 may provide functionality operable to retrieve item information from images captured, stored on, or accessed by a client device. For example, the item information retrieval system 150 may cause the client device 110 to access an image capture device or application on the client device 110, cause the client device 110 to encode the image data, cause the client device 110 to transmit the image data from the client device 110 to the item information retrieval system 150, and determine item information from optical machine-readable representations of data within the encoded image data. In some example embodiments, the item information retrieval system 150 may transmit decoded versions of the image data to the third party server(s) 130 to analyze and determine item information associated with the optical machine-readable representations of data contained in the image data. In some example embodiments, the item information retrieval system 150 may communicate with the publication system(s) 142 (e.g., accessing item listings, inventory quantities, or other item information) to update the inventory quantities, order additional inventory, or otherwise interact with item listings or information stored on the publication system(s) 142. In an alternative embodiment, the item information retrieval system 150 may be a part of the publication system(s) 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system(s) 142, payment system(s) 144, and item information retrieval system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
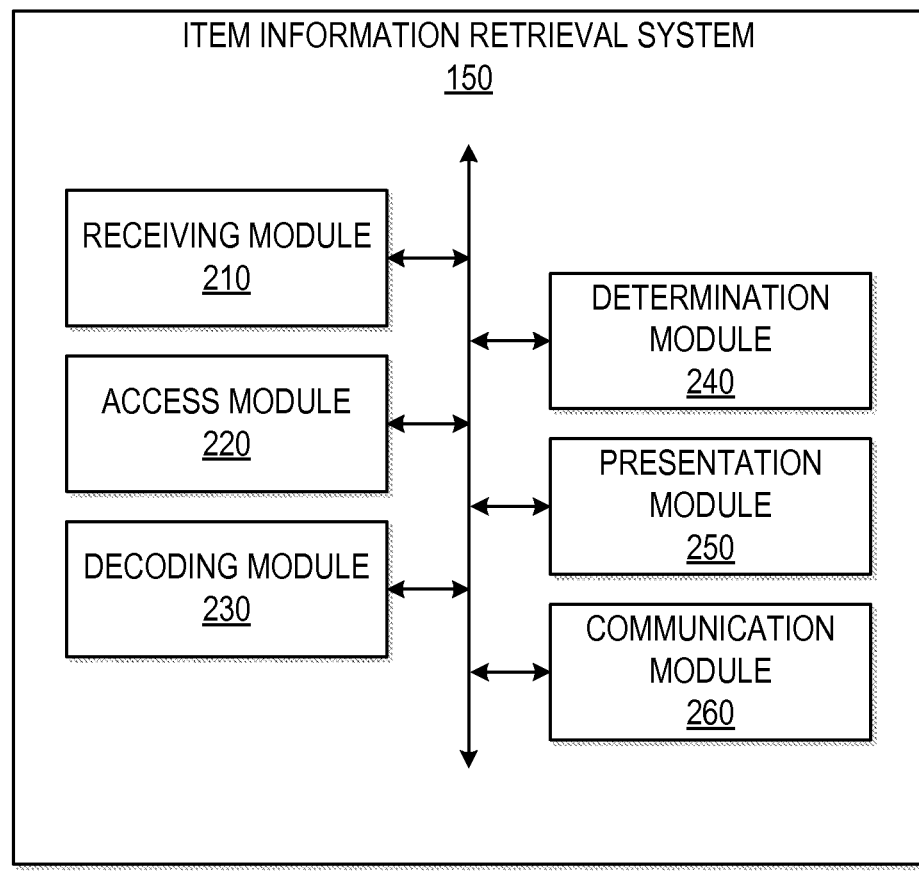
FIG. 2 is a block diagram of an example item information retrieval system, according to various embodiments.

FIG. 2 is a block diagram illustrating components of the item information retrieval system 150, according to some example embodiments. The item information retrieval system 150 is shown as including a receiving module 210, an access module 220, a decoding module 230, a determination module 240, a presentation module 250, and a communication module 260, all configured to communicate with one another (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform operations for which that module is designed. Moreover, any two or more of these modules may be combined into a single module, and the functions described herein for a single module may be subdivided among multiple modules. Furthermore, according to various example embodiments, modules described herein as being implemented within a single machine, database(s) 126, or device (e.g., client device 110) may be distributed across multiple machines, database(s) 126, or devices.

The receiving module 210 receives various requests and selections from the client device 110. The receiving module 210 may receive a provision requests from the client device 110. The provision request may be indicative of a request to provide a web application to the client device 110 across the network 104. In some instances, the receiving module 210 receives a selection request indicating selection of a user interface element from the client device 110. The receiving module 210 also receives image data from the client device 110. In some embodiments, the receiving module 210 receives encoded image data representative of one or more optical machine-readable representations of data. The receiving module 210 can be a hardware implemented module, a software implemented module, or a combination thereof. An example embodiment of components of the receiving module 210 is described with respect to the module described below.

The access module 220 causes the client device 110 to access an image capture application on the client device 110. The access module 220 may cause access of the image capture application based on a request from the client device 110 (e.g., the selection request). The access module 220 may transmit instructions to the client device 110 which cause the client device 110 to perform a set of operations after the image capture application is accessed and image data is captured or selected from an image library. One or more of the set of operations may cause the client device 110 to encode the image data and automatically transmit the encoded image data back to the item information retrieval system 150. The access module 220 can be a hardware implemented module, a software implemented module, or a combination thereof. An example embodiment of components of the access module 220 is described with respect to the module described below in the section entitled "Modules, Components, and Logic."

The decoding module 230 decodes the encoded image data. In some instances the decoding module 230 decodes the encoded image data to retrieve one or more optical machine-readable representations of data. The decoding module 230 may decode the encoded image data to generate or retrieve a data set (e.g., a numerical string) representing a numeric barcode or numeric expression of a barcode. The decoding module 230 can be a hardware-implemented module, a software implemented module, or a combination thereof. An example embodiment of components of the decoding module 230 is described with respect to the module described below in the section entitled "Modules, Components, and Logic."

The determination module 240 determines one or more items associated with the one or more optical machine-readable representations of data. In some instances, where the decoding module 230 has generated or retrieved the numeric barcode or numeric expression of the barcode, the determination module 240 determines one or more items associated with the barcode. In some embodiments, the determination module 240 determines the one or more items by transmitting the optical machine-readable representations of data, numeric barcode, or numeric representation of the barcode to a third party service. The determination module 240 may then receive the item data from the third party service. The determination module 240 can be a hardware implemented module, a software implemented module, or a combination thereof. An example embodiment of components of the determination module 240 is described with respect to the module described below in the section entitled "Modules, Components, and Logic."

The presentation module 250 causes presentation of item data representative of items associated with one or more optical machine-readable representations of data. For example, the presentation module 250 can generate a set of user interface elements, screens, frames, or the like for presentation at the client device 110. The presentation module 250 can cause presentation of the item data on the user interface of the client device 110. In some embodiments, the presentation module 250 can cause presentation of the item data by transmitting the item data to the client device 110. In some instances, the presentation module 250 may be implemented within the publication system(s) 142 in the context of a web application capable of communicating the item data to the client device 110. The presentation module 250 can be a hardware implemented module, a software implemented module, or a combination thereof. An example embodiment of components of the presentation module 250 is described with respect to the module described below in the section entitled "Modules, Components, and Logic."

The communication module 260 enables communication between the client device 110, the item information retrieval system 150, the publication system(s) 142, and one or more external systems (e.g., a UPC look-up service or the third party server(s) 130). In some example embodiments, the communication module 260 can enable communication among the receiving module 210, the access module 220, the decoding module 230, the determination module 240, and the presentation module 250. The communication module 260 can be a hardware-implemented module, a software-implemented module, or a combination thereof, as described in more detail below. For example, the communication module 260 can include communication mechanisms such as an antenna, a transmitter, one or more busses, and other suitable communication mechanisms capable of enabling communication between the modules 210-250, the client device 110, the item information retrieval system 150, and the publication system(s) 142. The communication module 260 can be a hardware-implemented module, a software-implemented module, or a combination thereof. An example embodiment of components of the communication module 260 is described with respect to the module described below in the section entitled "Modules, Components, and Logic."

Figure 3:
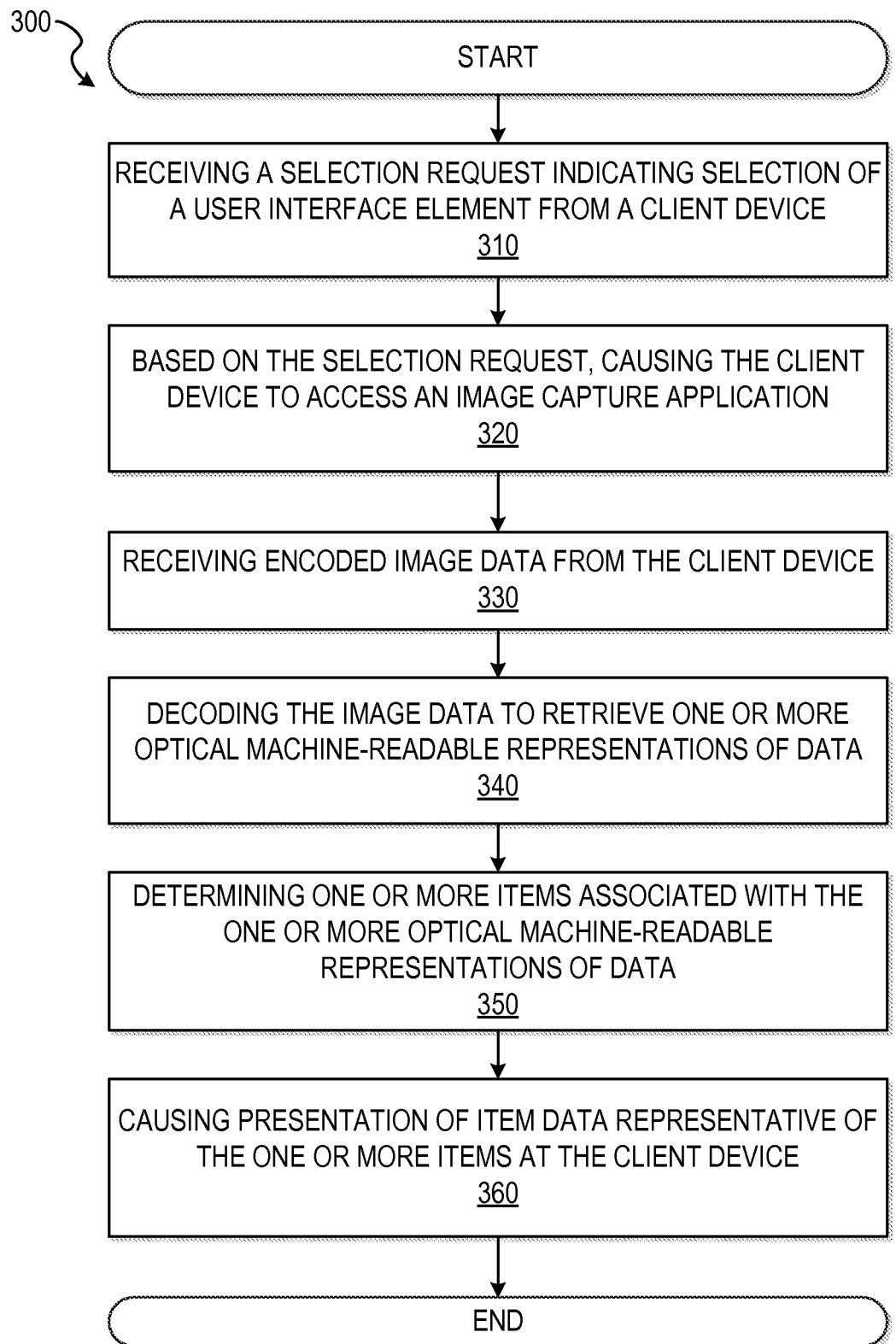
FIG. 3 is a flow diagram illustrating an example method, according to various embodiments.

FIG. 3 is a flow chart of operations of the item information retrieval system 150 in performing a method 300 of retrieving item information associated with the optical machine-readable representations of data, according to some example embodiments. Operations in the method 300 may be performed by the item information retrieval system 150, using modules described above with respect to FIG. 2. In some embodiments, the operations of the method 300 can be performed using modules of FIG. 2, without installing or otherwise storing portions of the modules on the client device 110. For example, the operations of the method 300 may be performed by temporarily loading portions of the modules of the item information retrieval system 150 into RAM of the client device 110 and rendering user interface elements on a display device of the client device 110. In this example, the modules of the item information retrieval system 150 are not downloaded or otherwise installed into the main memory (e.g., non-volatile random access memory or hard drive).

Figure 4:
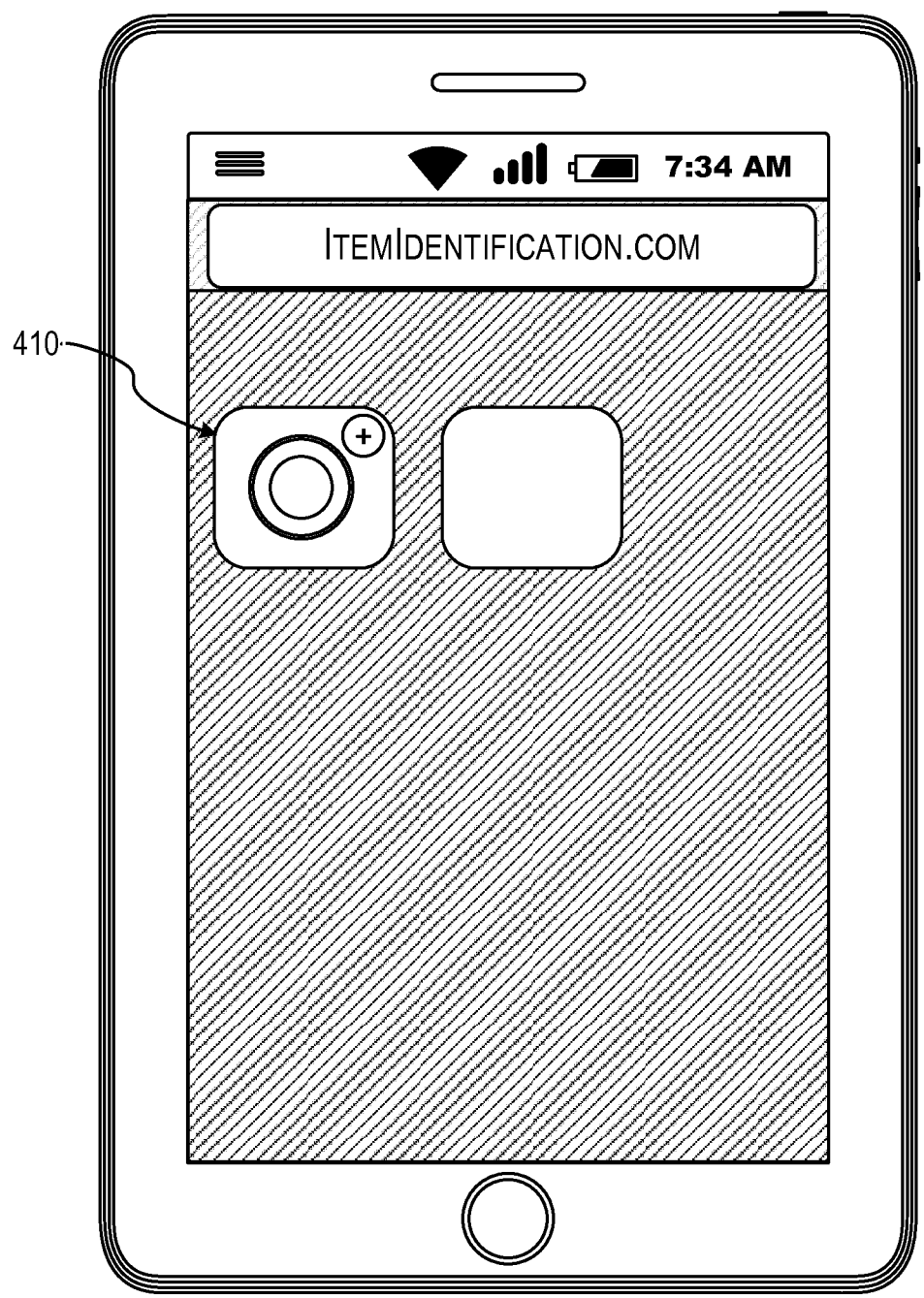
FIG. 4 is an interface diagram illustrating a user interface screen including a selectable user interface element presented on a client device, according to various embodiments.

In operation 310 the receiving module 210 receives a selection request indicating selection of a user interface element 410 from the client device 110, as shown in FIG. 4. The receiving module 210 may receive the selection request via the communication module 260. In some instances, the receiving module 210 may receive an indication of the selection of the user interface element 410 within a portion of the item information retrieval system 150 running on the client device 110.

Figure 5:
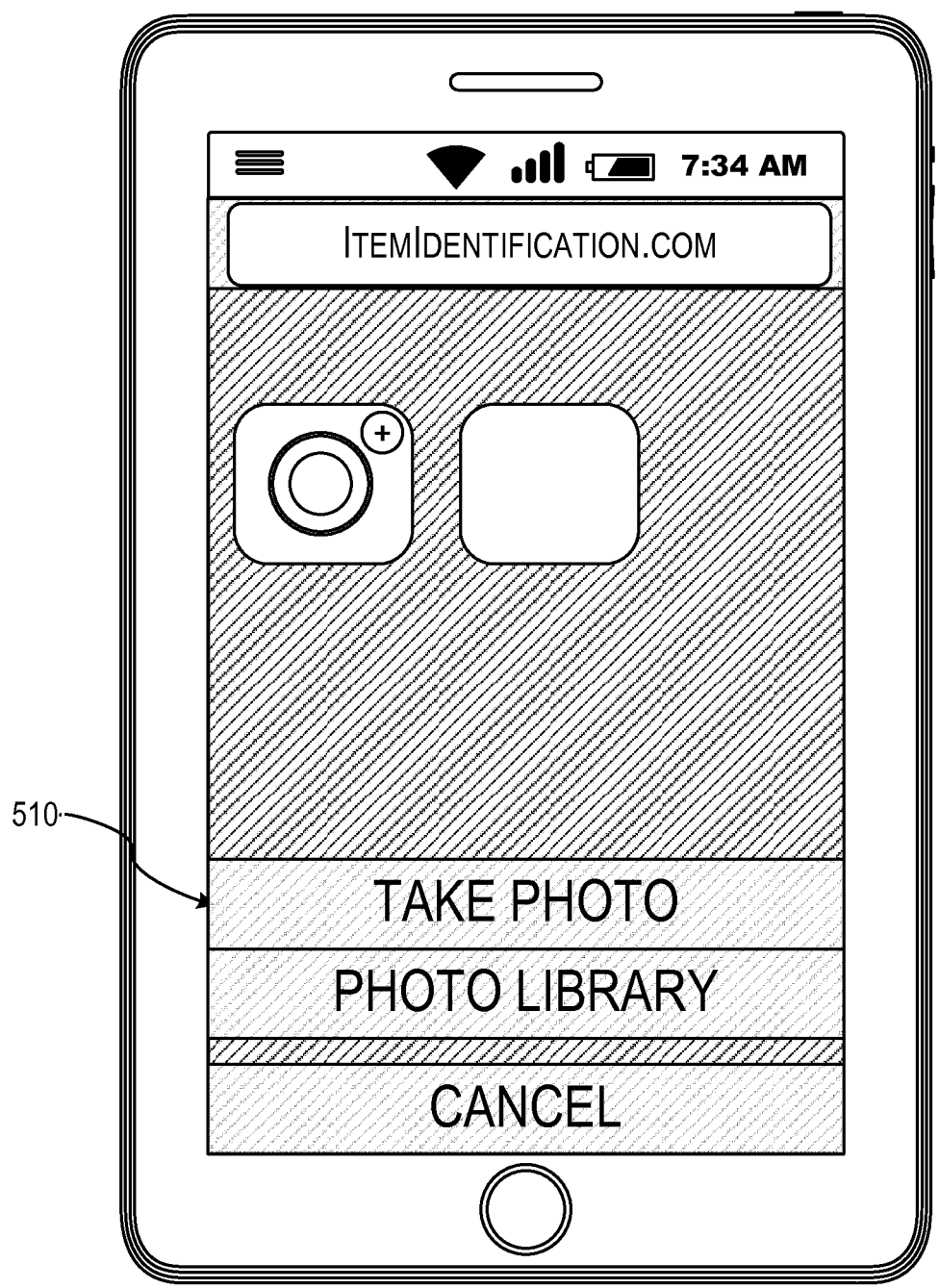
FIG. 5 is an interface diagram illustrating a client device being caused to access an image capture application by an example item information retrieval system, according to various embodiments.

In operation 320, based on the selection request, the access module 220 causes the client device 110 to access an image capture application 510, as shown in FIG. 5. In some embodiments, accessing the image capture application 510 causes the client device 110 to access an image capture device associated with the client device 110 and enables the capture of an image with the image capture device. For example, where the client device 110 is a smartphone, accessing the image capture application 510 can cause the smartphone to initiate a camera within the smartphone.

Initiating the camera can be understood as causing the user interface of the client device 110 to access and display at least a portion of the functions related to the camera, divert power to the camera, or the like. Once initiated, the smartphone can cause display of subjects perceived by the camera and enable one or more user interface options (e.g., physical buttons, switches, or user interface elements displayed on the display device) to cause the camera to capture an image. The subjects perceived by the camera may include one or more optical machine-readable representations of data. Example processor-executable instructions for a portion of the access module 220 may include:

```
function waitForImage( ) {
    if (image.prop('files').length === 0) return setTimeout(arguments.callee, 10);
        modal("Loading image...");
        var file = image.prop('files')[0];
        var reader = new FileReader( );
        var maxWidth = image.data('maxwidth') || false;
        var maxHeight = image.data('maxheight') || false;
        reader.onload = function(e) {
            var url = e.target.result;
            var context = canvas.getContext('2d');
            var img = new Image( );
            img.onload = function( ) {
                canvas.width = (maxWidth) ? Math.min(this.width, maxWidth) : this.width;
                canvas.height = (maxHeight) ? Math.min(this.height, maxHeight) : this.height;
                context.drawImage(img, 0, 0, canvas.width, canvas.height);
                var truePixels = context.getImageData(0, 0, canvas.width, canvas.height);
                // Grayscale
                    (function( ) {
                        var pixels = context.getImageData(0, 0, canvas.width, canvas.height);
                        var pixelData = pixels.data;
                        var c = 0, n = pixelData.length;
                        while (c < n) {
                            var r = pixelData[c];
                            var g = pixelData[c + 1];
                            var b = pixelData[c + 2];
                            pixelData[c] = pixelData[c + 1] = pixelData[c + 2] = (r + g + b) / 3;
                            c += 4;
                        }
                        context.putImageData(pixels, 0, 0);
                    })( );
                // Gate
                    (function( ) {
                        var pixels = context.getImageData(0, 0, canvas.width, canvas.height);
                        var pixelData = pixels.data;
                        var c = 0, n = pixelData.length;
                        var minLevel = 10;
                        while (c < n) {
                            if (pixelData[c] >= minLevel && pixelData[c + 1] >= minLevel && pixelData[c + 3] >= minLevel) {
                                pixelData[c] += 200;
                                pixelData[c + 1] += 200;
                                pixelData[c + 2] += 200;
                            }
                            c += 4;
                        }
                        context.putImageData(pixels, 0, 0);
                    })( );
                var data = canvas.toDataURL( );
                var base64 = data.substr(data.indexOf('base64,') + 7);
```

Figure 6:
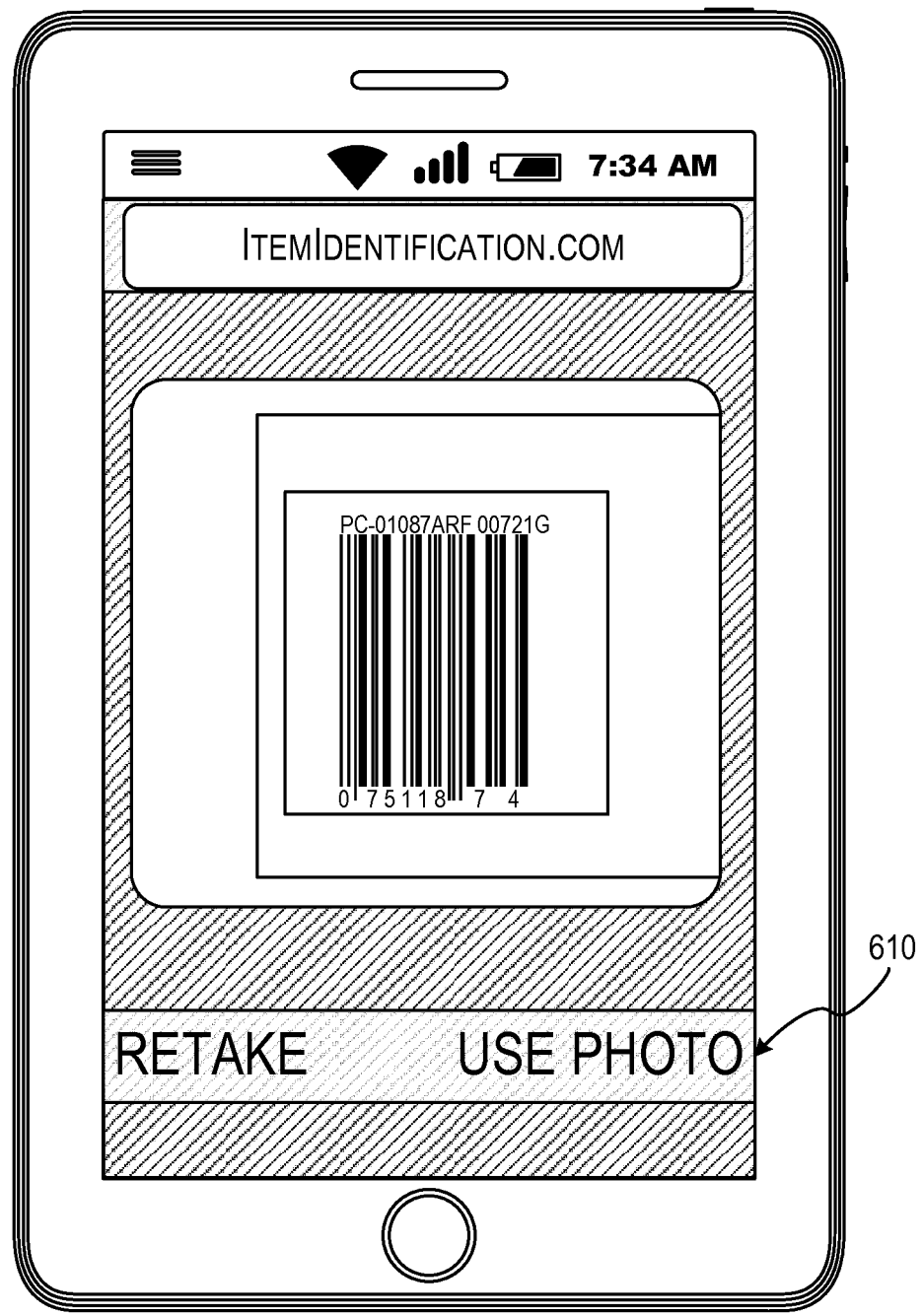
FIG. 6 is an interface diagram illustrating an image being captured, including an optical machine-readable representation of data, by the image capture application of the client device, according to various embodiments.

As shown in FIG. 6, and the example processor-executable instructions described above, once the image capture device has been accessed, a user interface element may be selected to cause the image capture device to capture one or more images. The user may be prompted to select a selectable user interface element 610 to cause the access module 220 to encode and transmit the captured image. In some embodiments, the one or more images captured by the image capture device may be received, copied, or otherwise stored within an image library on the client device 110.

In some embodiments, the access module 220 includes image processing instructions capable of manipulating the image data of the one or more captured images. For example, once the one or more images have been captured, the access module 220 may determine a characteristic set for the image data, such as color balance, white balance, resolution, contrast, edge contrast, and other suitable characteristics. In some instances, the access module 220 modifies the image data to optimize the optical machine-readable representations of data contained within the image data. For example, where edges of the optical machine-readable representations are blurred or otherwise obfuscated, the access module 220 may perform one or more edge enhancement operations to enhance edge contrast within the image data. By way of further example, the access module 220 may modify the image data by converting the image data to grayscale, or otherwise adjusting one or more color or contrast value of the image data, to increase contrast of the optical machine-readable representation of data included within the image data. In some embodiments, the image optimization may be performed where the image was captured in low-light or vivid color circumstances. The image optimization processes may be understood as a set of processes used to modify the captured image data to increase detectability and readability of the optical machine-readable representations of data.

As shown above with respect to the example processor-executable instructions, once the image capture device has captured an image, the access module 220 may cause the client device 110 to encode the image captured by the image capture device. As shown in the example processor-executable instructions, the image may be encoded using base64 encoding. In some embodiments, base64 encoding may generate a larger encoded image data set than a data set for the captured image presented in binary or other encoding schemes. The base64 encoding may enable support of a wider range of applications and web browsers than using binary or other encoding mechanisms. In embodiments using base64 encoding, the binary data of the image may be converted or encoded into an ASCII string. The base64 encoding can enable the data set of the encoded image data to remain intact without modification during transport. The encoded image may then be transmitted to the item information retrieval system 150.

In some embodiments, the access module 220 may use an asynchronous JavaScript and XML (AJAX) request. The AJAX request may include an HTML 5 output with a Canvas HTML 5 tag. In some embodiments, the Canvas HTML 5 tag may limit the captured image including the optical machine-readable representation of data to a resolution of 640×480 pixels. The AJAX request may also cause the conversion of the captured image into the encoded image. For example the AJAX request may cause the captured image, having a resolution of 640×480 pixels, to be encoded using base64 encoding. In some embodiments, the access module 220 may use GET or other requests in addition to or as an alternative to the AJAX request.

In some embodiments, accessing the image capture application 510 causes the client device 110 to access an image library, database, or other repository of image data stored on the client device 110 or accessible thereto. In some embodiments, one or more images stored in the image library may include one or more optical machine-readable representations of data (e.g., a barcode). Accessing the image library can include accessing a folder or other data structure on a non-transitory machine-readable storage medium (e.g., a hard drive or RAM) of the client device 110. Once the image library has been accessed, the client device 110 can cause presentation of one or more images, or reduced size representations (e.g., thumbnails), stored within the image library. The client device 110 may receive a selection of a user interface element indicative of a user selecting one or more of the images stored in the image library. When one or more images have been selected, the access module 220 may cause the client device 110 to encode the one or more selected images (e.g., using a suitable encoding method such as base64) and transmit the one or more encoded images to the item information retrieval system 150.

In some embodiments, an optical machine-readable representation of data can be understood as an encoded representation of identification information for an item, product, or service represented by an article including the optical machine-readable representation of data. For example, the optical machine-readable representation of data can be implemented as a numerical code (e.g., Codabar, Code 11, EAN-13, EAN-8, MSI, Plessey, UPC-A, UPC-E, etc.), alphanumerical code (e.g., Code 128, Code 39, Code 93, LOGMARS, etc.), a barcode (e.g., UPC code barcode symbol), a two-dimensional barcode (e.g., PDR 417, DataMatrix, Maxicode, QR Code, etc.), or any other suitable optical machine-readable representation of data.

In operation 330, the receiving module 210 receives encoded image data from the client device 110. The encoded image data may be representative of one or more optical machine-readable representations of data. For example, as shown in FIG. 6, the receiving module 210 may receive a single optical machine-readable representation of data (e.g., a barcode). In some instances, the encoded image data may include a plurality of images, with each image containing a single optical machine-readable representation of data. In some embodiments, the encoded image data may include one or more images, with each image containing one or more optical machine-readable representation of data. The receiving module 210 may receive the encoded image data directly from the client device 110 or via the communication module 260. The encoded image may be sent to the receiving module 210 of the item information retrieval system 150 using an API call to the item information retrieval system 150. In some embodiments, the receiving module 210 may receive the encoded image data in the form of an AJAX request, a JavaScript Object Notation (JSON), a GET request, or other suitable requests.

In operation 340, the decoding module 230 may process or digest (e.g., decode) the encoded image data to decode the encoded image data and retrieve the one or more optical machine-readable representations of data. For example, where the encoded image data is encoded using base64 encoding, the decoding module 230 may process the encoded image data to generate or retrieve the binary version of the image data. In some embodiments, the decoding module 230 may perform multiple decoding operations such as, for example, where the encoded image data is transmitted to the receiving module 210 using an encryption protocol for obfuscating message contents transmitted over an open network. In these embodiments, the decoding module 230 may decrypt the encoded image data and then decode the image data to generate or retrieve the image data.

In some instances, the decoding module 230 may process the optical machine-readable representation of data to retrieve or generate a numeric representation. For example, where the optical machine-readable representation is a barcode symbol, the decoding module 230 may process the barcode symbol to retrieve or generate a numerical representation in the form of a numeric barcode representative or included within the barcode symbol. In some embodiments, the decoding module 230 includes or accesses digital image processing instructions to retrieve the numerical representation. The image processing instructions may enable the decoding module 230 to interpret contrast or other suitable image signals, in the optical machine-readable representation of data, to retrieve or generate the numerical representation coded into the optical machine-readable representation of data.

In operation 350, the determination module 240 determines one or more items associated with the one or more optical machine-readable representations of data or the numerical representation. In some embodiments, the determination module 240 may access a database, set of databases, a table, or other suitable data structure containing item data associated with the one or more optical machine-readable representations of data. In these instances, the determination module 240 may compare optical machine-readable representations of data to the database (e.g., database(s) 126) to retrieve item data associated with the optical machine-readable representations of data. In some embodiments, the item data may include a name, description, physical dimensions, a location of the item, a quantity of the item, a product identification code, a product identification code format (e.g., Universal Product Code (UPC) type), or any other identifying information for the item. In some circumstances, the item information may be a link or other representational data capable of directing the determination module 240 to a third party service or separate data structure containing identifying information for the item.

Figure 7:
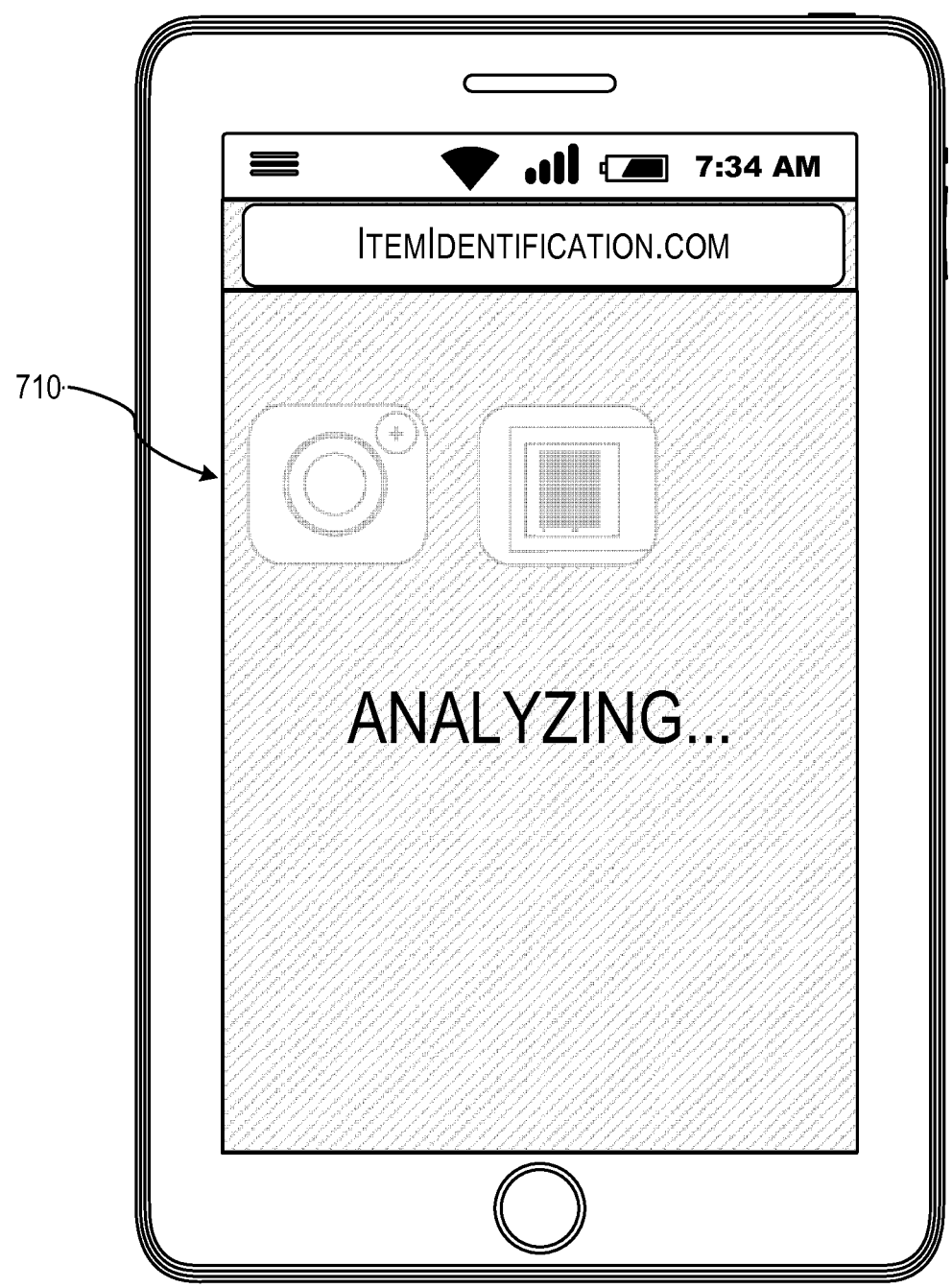
FIG. 7 is an interface diagram illustrating an overlay user interface element presented on the client device and indicating that the example item information retrieval system is retrieving item information associated with the optical machine-readable representation of data depicted in the image, according to various embodiments.

As shown in FIG. 7, during the determination process, the presentation module 250 may cause the client device 110 to present an overlay user interface element 710. The overlay user interface element 710 may indicate that the item information retrieval system 150 is performing an action relating to retrieving item information associated with the optical machine-readable representation of data depicted in the image data. In some embodiments, the overlay user interface element 710 may change, representing separate processes being performed by the item information retrieval system 150. Although shown as an overlay of a portion of a user interface presented to on the client device 110, it will be appreciated that the overlay user interface element 710 may be any size or shape and may occupy any amount of a display device of the client device 110. For example in some embodiments, the overlay user interface element 710 may cover the entire viewable area of the display device and preclude further operations during the period of time in which the item information retrieval system 150 is performing the associated operation.

In some embodiments, where the display device is a touchscreen, the overlay user interface element 710 may preclude only those operations requiring interaction with the touchscreen. In these instances, the overlay user interface element 710 may allow user interrupts to be generated using one or more physical input devices associated with the client device 110 (e.g., buttons, a mouse, a physical keyboard, etc.) in order to interrupt, pause, cancel, or otherwise temporarily or permanently cease communication between the client device 110 and the item information retrieval system 150. When communication between the client device 110 and the item information retrieval system 150 is temporarily or permanently ceased (e.g., for a current communication session), the presentation module 250 may cease causing presentation of user interface elements at the client device 110.

In operation 360, the presentation module 250 causes presentation of item data representative of the one or more items at the client device 110. In some instances, the presentation module 250 can cause presentation of the item data by transmitting the item data to the client device 110 in response to receiving the encoded image data. In some embodiments, the item data may be dynamically injected into the web application presented at the client device 110. When dynamically injected into the web application, the item data may be presented at the client device 110 without refreshing the web application or the user interface displayed at the client device 110.

Figure 8:
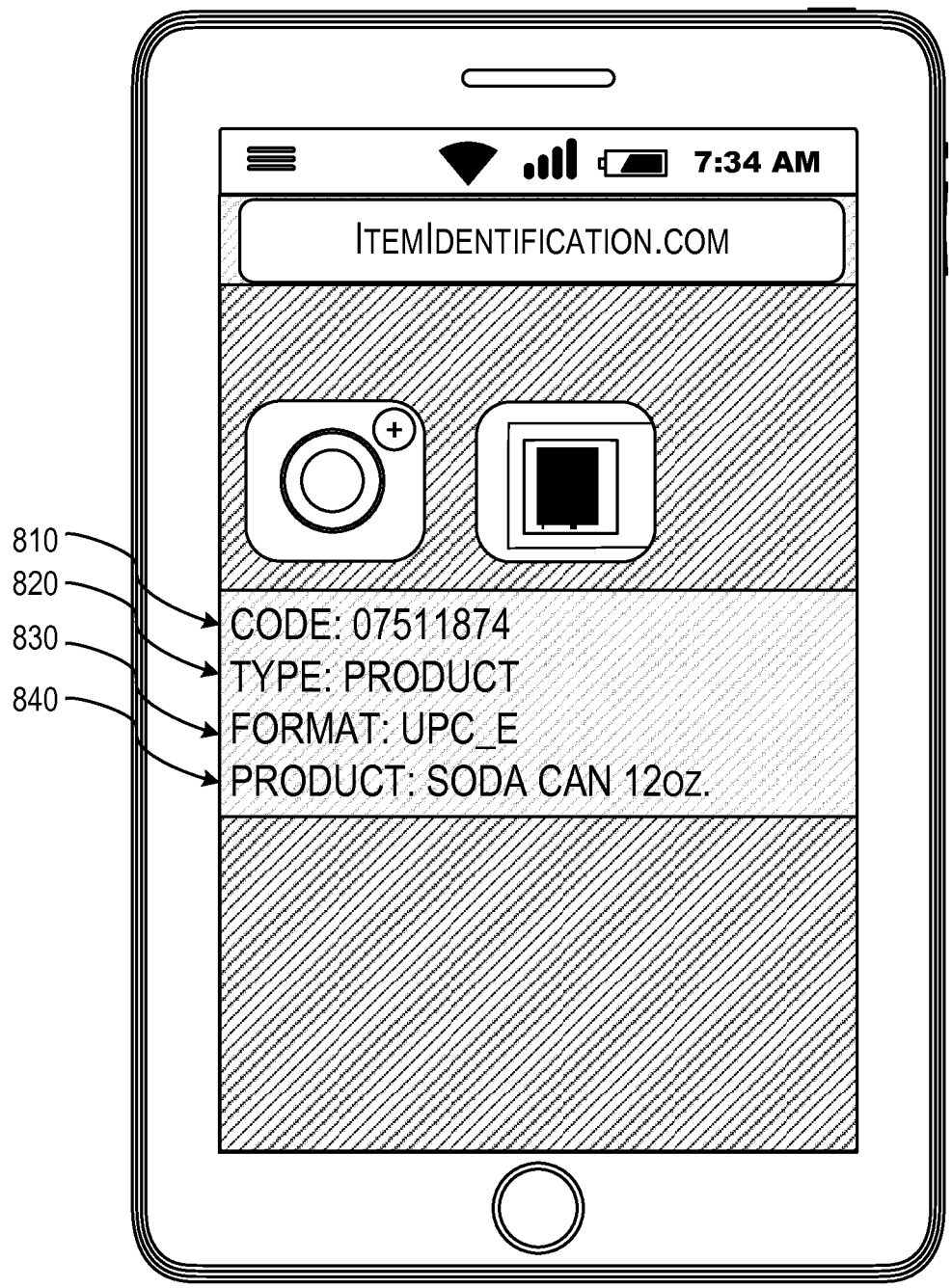
FIG. 8 is an interface diagram illustrating a user interface screen presenting item data including one or more characteristics of the item and the optical machine-readable representation of data on the client device.

For example, as shown in FIG. 8, the presentation module 250 causes presentation of item data including one or more characteristics of the item and the optical machine-readable representation of data. In some embodiments, the presentation can include presenting a code identifier 810, a type identifier 820, a format identifier 830, and a product identifier 840. The code identifier 810 can identify the optical machine-readable representation of data. For example, the code identifier 810 can be a numeric universal product code (UPC) (e.g., a numerical translation of the optical machine-readable representation of data). The type identifier 820 may identify a type characteristic of the item. For example, the type identifier 820 may return the item as a product, a service, a category of a product, or other identification relating to an identifiable or quantifiable characteristic of the item. The format identifier 830 may identify a format of the optical machine-readable representation of data such as a UPC type (e.g., UPC-A, UPC-E), a Codabar, a Code 11, an EAN-13, an EAN-8, an MSI, a LOGMARS, a Code 128, a PDF417, a DataMatrix, a Maxicode, a QR Code, or other suitable or recognized formats for optical machine-readable representations of data. The product identifier 840 can be a descriptive representation or title of the product. As shown, the product identifier 840 is "Soda Can 12 oz" and provides a description of the item to which the optical machine-readable representation of data is connected. Although shown as a generic product identifier, the product identifier 840 can include a generic description or title, a brand name, a trademark, a product title, a product nickname, a product abbreviation, or any suitable product identifier. In some embodiments, the product identifier 840 may be a human-readable name or identifier for the item.

Figure 9:
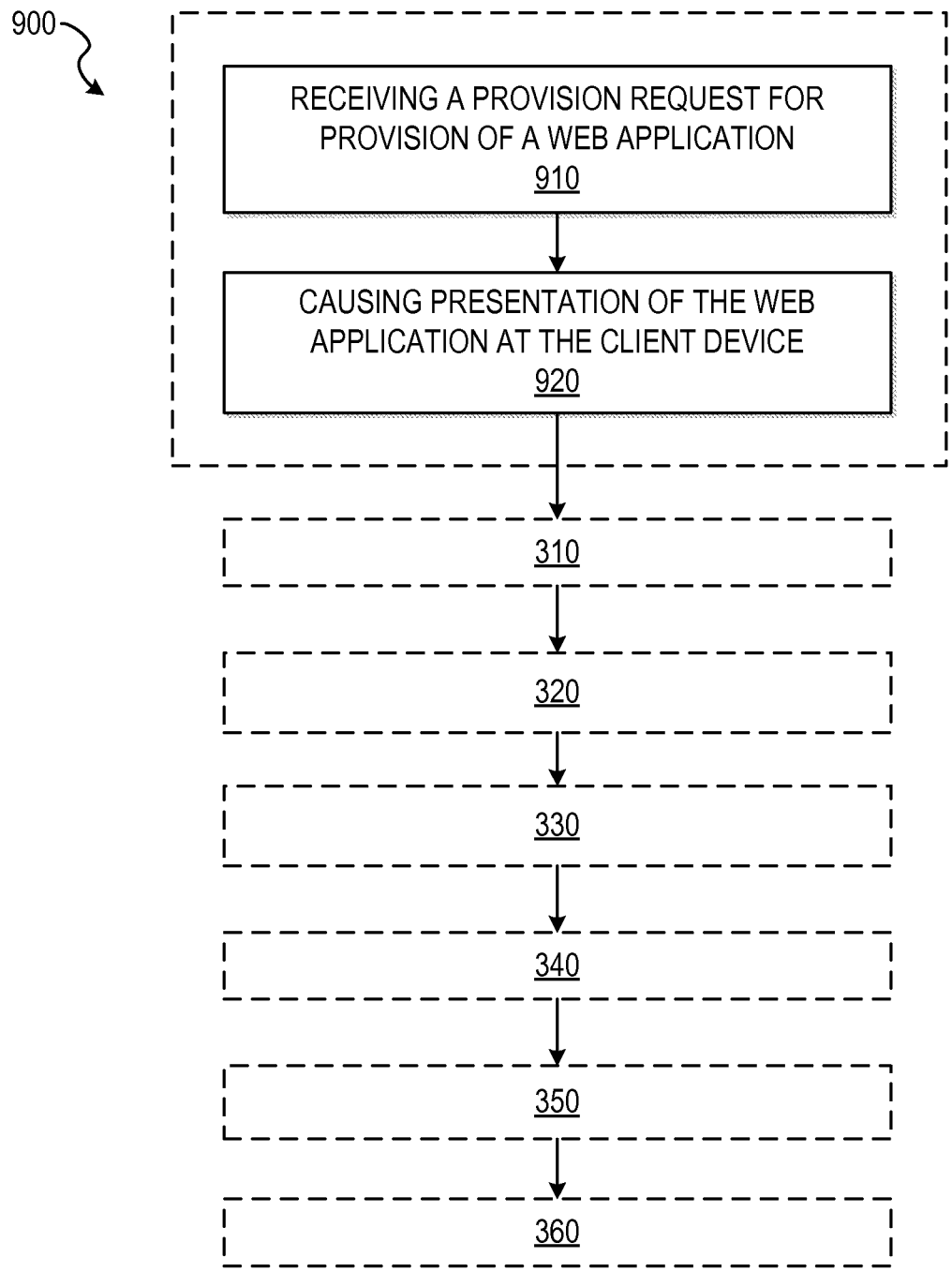
FIG. 9 is a flow diagram illustrating an example method, according to various embodiments.

FIG. 9 is a flow chart of operations of the item information retrieval system 150 in performing a method 900 of retrieving item information associated with the optical machine-readable representations of data, according to some example embodiments. Operations in the method 900 may be performed by the item information retrieval system 150, using modules described above with respect to FIG. 2. In some embodiments, the operations of the method 900 can be performed using modules of FIG. 2, without installing or otherwise storing portions of the modules on the client device 110. For example, the operations of the method 900 may be performed by temporarily loading portions of the modules of the item information retrieval system 150 into RAM of the client device 110 and rendering user interface elements on a display device of the client device 110. In this example, the modules of the item information retrieval system 150 are not downloaded or otherwise installed into the main memory (e.g., non-volatile random access memory or hard drive). In some instances, as shown in FIG. 9, the method 900 may include one or more operations of the method 300.

In operation 910, the receiving module 210 receives, at one or more processor associated with the receiving module 210, a provision request for provision of a web application. The receiving module 210 may receive the provision request from the client device 110 directly, via the communication module 260, or in any other suitable manner. In some embodiments, the provision request may be performed over a known network internal to an organization associated with the item information retrieval system 150. For example, a store employing the item information retrieval system 150 may have an internal network, such as a WiFi network, providing connection between the client device 110, the store, and an inventory management system (e.g., vendor warehouse system). In these embodiments, the receiving module 210 may receive the provision request from the client device 110 over the known network.

In some embodiments, modules of the item information retrieval system 150 can establish a secure session between the client device 110 and the item information retrieval system 150, the publication system(s) 142, and/or the third party server(s) 130, after receiving the provision request. For example, the item information retrieval system 150 may establish a secure session using HTTP over Transport Layer Security (TLS), HTTP over Secure Sockets Layer (SSL), HTTP Secure, or other secure session protocols. Further, in some embodiments, the item information retrieval system 150 may employ asynchronous communication. In these embodiments, the item information retrieval system 150 may cause dynamic injection of information into the user interface screens presented by the web browser. By using asynchronous communication, the item information retrieval system 150 may prevent the web browser from unnecessary page loading, loading additional pages, or otherwise refreshing of pages, and conserve bandwidth of the network 104.

In operation 920, the presentation module 250 causes presentation of the web application at the client device 110. The web application may be presented at the client device 110 using an application (e.g., web browser) installed on the client device 110. The presentation module 250 may cause presentation of the web application with one or more selectable user interface elements, such as user interface element 410 displayed in FIG. 4, displayed within a user interface screen. In some instances, the user interface screen and the one or more selectable user interface elements may be rendered and presented within the application (e.g., web browser) on the client device 110.

In some embodiments, the presentation module 250 may cause presentation of the web application only when the client device 110 has been authenticated to the item information retrieval system 150. For example, where the receiving module 210 receives the provision request from a known network (e.g., a password protected WiFi network internal to the store), one or more modules of the item information retrieval system 150 may authenticate the client device 110 based on receiving the provision request via the known network. In some embodiments, the presentation module 250 causes presentation of a login screen on the client device 110, such that a prospective user of the item information retrieval system 150 authenticates the user and/or client device 110. For example, the store may give a password or username and password combination to seasonal employees who may interact with the item information retrieval system 150. Upon presentation of the login screen (e.g., a user interface screen with one or more interactive user interface elements), the prospective user may enter authentication information into the one or more interactive user interface elements. The receiving module 210 may then receive the authentication information and cause the client device 110 to be authenticated to the item information retrieval system 150, and cause presentation of the web application at the client device 110.

After presentation of the web application at the client device 110, the method 900 may be performed using the operations outlined above for the method 300, including the operations 310, 320, 330, 340, 350, and 360, as described in more detail above.

Figure 10:
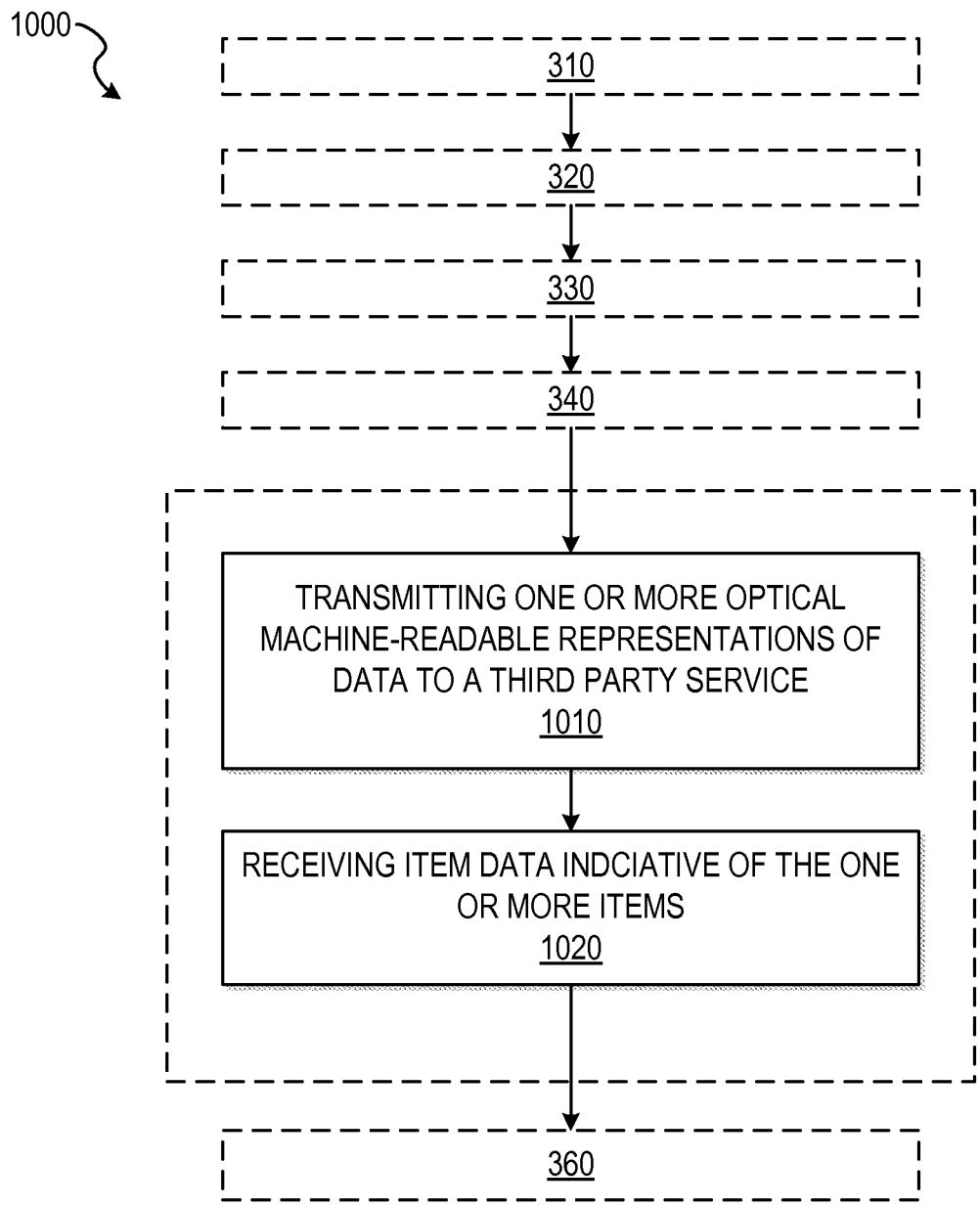
FIG. 10 is a flow diagram illustrating an example method, according to various embodiments.

FIG. 10 is a flowchart illustrating operations of the item information retrieval system 150 in performing a method 1000 of retrieving information associated with the optical machine-readable representations of data, according to some example embodiments. In some embodiments, the method 1000 includes one or more operations from the method 300, as shown in FIG. 10 and described below.

The method 1000 may be performed by executing operations 310-340, described above. After operation 340, in operation 1010, the determination module 240 transmits the one or more optical machine-readable representations of data to a third party service. In some embodiments, the determination module 240 may transmit a plurality of optical machine-readable representations of data to the third party service as a batch transmission. The third party service may be hosted or otherwise stored on the third party server(s) 130 and accessed using the third party application 132. In some instances, the third party service is capable of determining one or more items associated with the one or more optical machine-readable representations of data. For example, the third party service may be a UPC look up service, an item manufacturer database look up service, a database cross referencing optical machine-readable representations of data and item data, or other suitable service or database.

In operation 1020, the receiving module 210 receives item data indicative of the one or more items. The item data may be received from the third party service via the communication module 260 across the network 104. In embodiments where the third party service receives a plurality of optical machine-readable representations of data as a batch transmission, the receiving module 210 can receive the item data indicative of the plurality of optical machine-readable representations of data as a batch or in separate discrete transmissions. After receiving the item data in operation 1020, the method 1000 may be performed by executing operation 360, causing presentation of the item data representative of the one or more items at the client device, as described above.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-10 are implemented in some embodiments in the context of a machine and an associated software architecture. The sections below describe representative software architecture(s) and machine (e.g., hardware) architecture that are suitable for use with the disclosed embodiments for the item information retrieval system 150 and the modules contained therein.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 11:
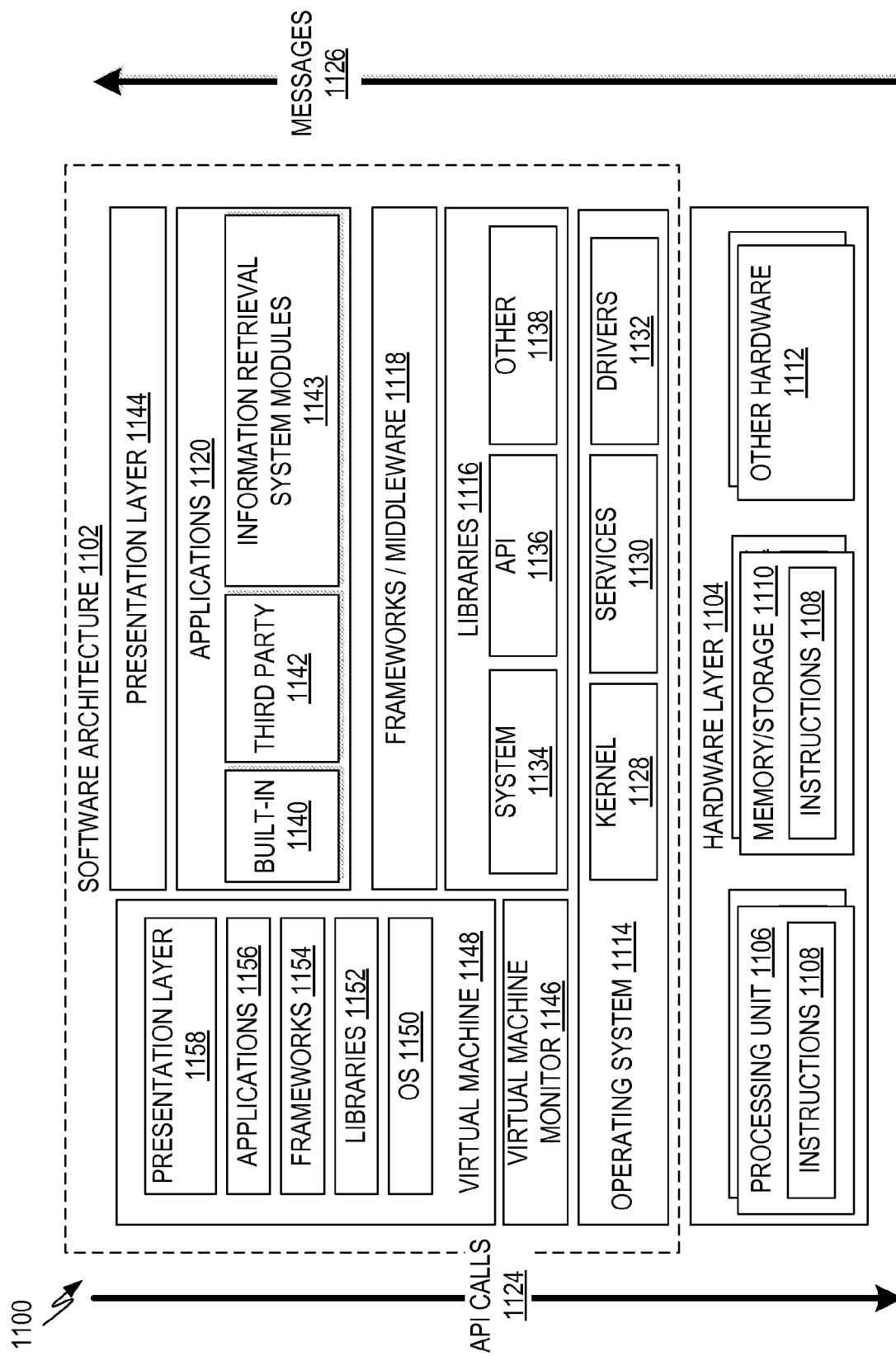
FIG. 11 is a block diagram illustrating an example of a software architecture that may be installed on a machine, according to some example embodiments.

FIG. 11 is a block diagram 1100 illustrating a representative software architecture 1102, which may be used in conjunction with various hardware architectures herein described, such as the information retrieval system 150. FIG. 11 is merely a non-limiting example of a software architecture and it will be appreciated that many other architectures may be implemented to facilitate the functionality described herein. The software architecture 1102 may be executing on hardware such as machine 1200 of FIG. 12 that includes, among other things, processors 1210, memory 1230, and I/O components 1250. A representative hardware layer 1104 is illustrated and can represent, for example, the machine 1200 of FIG. 12. The representative hardware layer 1104 comprises one or more processing units 1106 having associated executable instructions 1108. Executable instructions 1108 represent the executable instructions of the software architecture 1102, including implementation of the methods, modules and so forth of FIGS. 1-10. Hardware layer 1104 also includes memory and/or storage modules 1110, which also have executable instructions 1108. Hardware layer 1104 may also comprise other hardware as indicated by 1112, which represents any other hardware of the hardware layer 1104, such as the other hardware illustrated as part of machine 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120 and presentation layer 1144. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPREG 4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware 1118 (also sometimes referred to as middleware) may provide a higher-level common infrastructure that may be utilized by the applications 1120 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1120 and/or other software components/modules, some of which may be specific to a particular operating system or platform.

The applications 1120 include built-in applications 1140, third party applications 1142, and/or information retrieval system modules 1143. Examples of representative built-in applications 1140 may include, but are not limited to, a contacts application, a browser application, a book reader application, a location application, a media application, a messaging application, and/or a game application. Third party applications 1142 may include any of the built-in applications 1140 as well as a broad assortment of other applications. In a specific example, the third party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1142 may invoke the API calls 1124 provided by the mobile operating system such as operating system 1114 to facilitate functionality described herein. Information retrieval system modules 1143 may include the receiving module 210, the access module 220, the decoding module 230, the determination module 240, the presentation module 250, and the communication module 260 of the information retrieval system 150. Although shown in the applications layer 1120, all or portions of the information retrieval system modules 1143 may reside in the frameworks/middleware layer 1118 and/or the hardware layer 1104.

The applications 1120 may utilize built-in operating system functions (e.g., kernel 1128, services 1130 and/or drivers 1132), libraries (e.g., system libraries 1134, API libraries 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware machine (such as the machine of FIG. 12, for example). A virtual machine is hosted by a host operating system (operating system 1114 in FIG. 11) and typically, although not always, has a virtual machine monitor 1146, which manages the operation of the virtual machine 1148 as well as the interface with the host operating system (i.e., operating system 1114). A software architecture executes within the virtual machine 1148 such as an operating system 1150, libraries 1152, frameworks/middleware 1154, applications 1156 and/or presentation layer 1158. These layers of software architecture executing within the virtual machine 1148 can be the same as corresponding layers previously described or may be different.

Example Machine Architecture and Machine-Readable Medium

Figure 12:
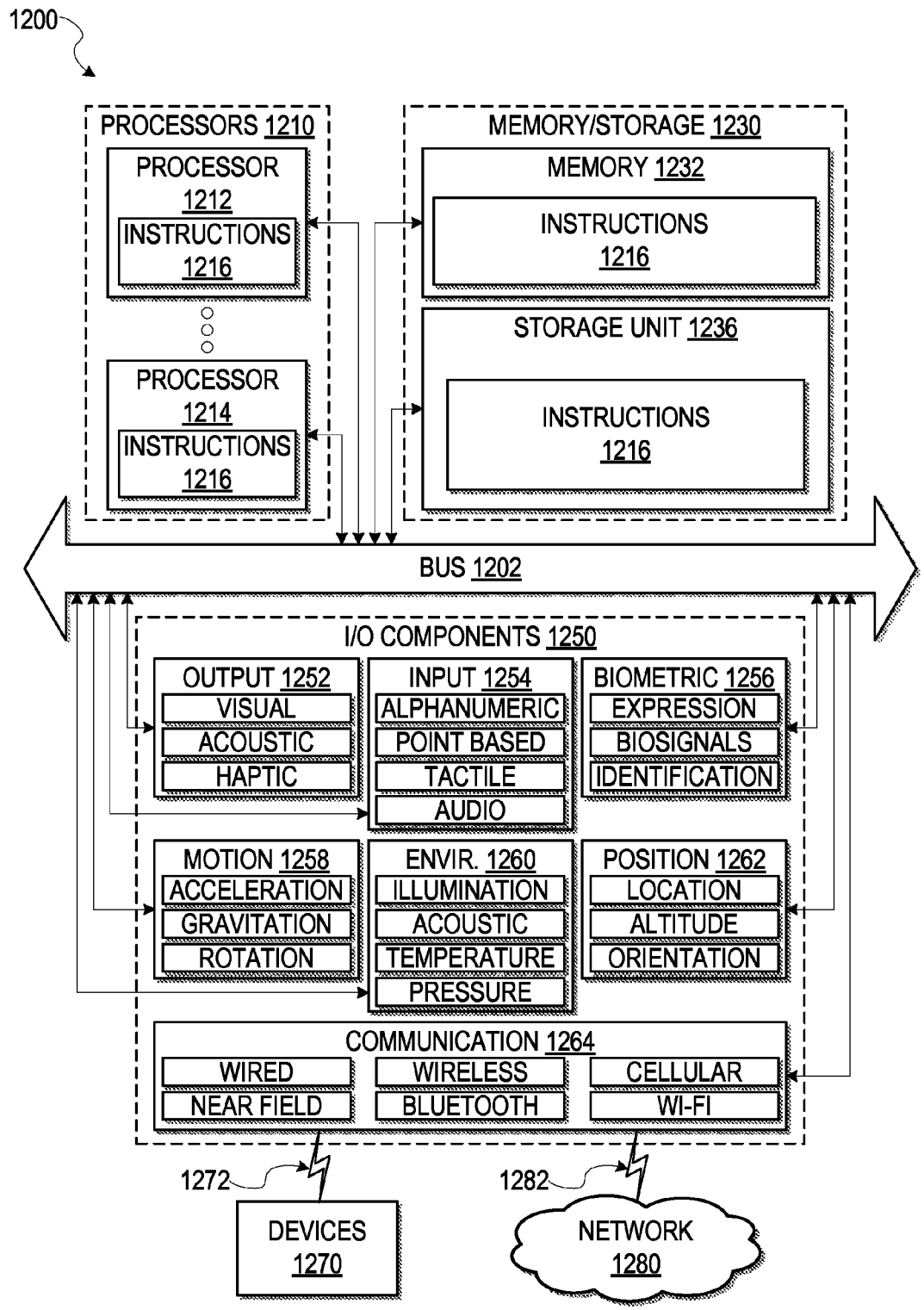
FIG. 12 illustrates a diagrammatic representation of a machine in the form of a computer system within which a set of instructions may be executed for causing the machine to perform any one or more of the methodologies discussed herein, according to an example embodiment.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example the instructions 1216 may cause the machine 1200 to execute the flow diagrams of FIGS. 1, 9, and 10. Additionally, or alternatively, the instructions 1216 may implement the receiving module 210, the access module 220, the decoding module 230, the determination module 240, the presentation module 250, and the communication module 260 of FIGS. 1-10, and so forth. The instructions 1216 transform the general, non-programmed machine into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1212 and processor 1214 that may execute instructions 1216. The term "processor" is intended to include multi-core processor that may comprise two or more independent processors (sometimes referred to as "cores") that may execute instructions contemporaneously. Although FIG. 12 shows multiple processors 1210, the machine 1200 may include a single processor with a single core, a single processor with multiple cores (e.g., a multi-core process), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of processors 1210 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via coupling 1282 and coupling 1272 respectively. For example, the communication components 1264 may include a network interface component or other suitable device to interface with the network 1280. In further examples, communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a Universal Serial Bus (USB)).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 1280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or other type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to devices 1270. The term "transmission medium" shall be taken to include any intangible medium that is capable of storing, encoding, or carrying instructions 1216 for execution by the machine 1200, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system, comprising:
one or more processors of a server machine; and
a non-transitory machine-readable storage medium comprising processor executable instructions that, when executed by the one or more processors, cause the server machine to perform operations comprising:
receiving, by the server machine, a selection request indicating selection of a user interface element from a client device prompting a server response, the server machine being remote from the client device and communicating with the client device via a communications network;
causing the client device to access an image capture application, based on the selection request;
in response to an image being captured by the client device, causing, by the server machine, the client device to determine a characteristic set of the image to selectively modify one or more attributes of one or more optical machine-readable representations of data included in the image;
receiving encoded image data from the client device, the encoded image data being representative of at least a portion of the image including the one or more optical machine-readable representations of data, the encoded image data comprising a character string representing the portion of the image including the one or more optical machine-readable representations of data, the character string configured for intact transmission from the client device to the server machine;
decoding, by the server machine, the image data to retrieve the one or more optical machine-readable representations of data;
determining, by the server machine, one or more items associated with the one or more optical machine-readable representations of data; and
causing presentation of item data representative of the one or more items at the client device.

2. The system of claim 1, wherein the operations further comprise:
receiving a provision request, from the client device, to provision a web application; and
causing presentation of the web application at the client device.

3. The system of claim 2, wherein the operations further comprise:
causing presentation of the item data by dynamically injecting the item data into the presentation of the web application.

4. The system of claim 3, wherein the item data is dynamically injected into the presentation of the web application without refreshing the web application.

5. The system of claim 1, wherein accessing the image capture application causes the client device to access an image capture device associated with the client device and enables capture of an image with the image capture device.

6. The system of claim 5, wherein causing the client device to access the image capture application causes the client device to encode an image captured by the image capture device.

7. The system of claim 1, wherein the operations further comprise:
transmitting the one or more optical machine-readable representations of data to a third party service, the third party service capable of determining the one or more items associated with the one or more optical machine-readable representations of data, and receives the item data indicative of the one or more items.

8. The system of claim 1, wherein the one or more optical machine-readable representations of data are one or more barcodes.

9. A method, comprising:
receiving, at a server machine, a selection request indicating selection of a user interface element from a client device prompting a server response, the server machine being remote from the client device and communicating with the client device via a communications network;
based on the selection request, causing, by the server machine, the client device to access an image capture application;
in response to an image being captured by the client device, causing, by the server machine, the client device to determine a characteristic set of the image to selectively modify one or more attributes of one or more optical machine-readable representations of data included in the image;
receiving, at the server machine, encoded image data from the client device, the encoded image data being representative of at least a portion of the image including the one or more optical machine-readable representations of data, the encoded image data comprising a character string representing the portion of the image including the one or more optical machine-readable representations of data, the character string configured for intact transmission from the client device to the server machine;
decoding, by the server machine, the image data to retrieve the one or more optical machine-readable representations of data;
determining one or more items associated with the one or more optical machine-readable representations of data; and
causing presentation of item data representative of the one or more items at the client device.

10. The method of claim 9 further comprising:
receiving, at one or more processor, a provision request for provision of a web application from the client device; and
causing presentation of the web application at the client device.

11. The method of claim 10, wherein causing presentation of the item data at the client device further comprises:
dynamically injecting the item data into the web application presented at the client device.

12. The method of claim 11, wherein the item data is dynamically injected into the presentation of the web application without refreshing the web application.

13. The method of claim 9, wherein accessing the image capture application includes accessing an image capture device associated with the client device and capturing an image with the image capture device.

14. The method of claim 13, wherein causing the client device to access the image capture application causes the client device to encode the image captured by the image capture device.

15. The method of claim 14, wherein the image captured by the image capture device is encoded using base64 encoding.

16. The method of claim 9, wherein accessing the image capture application includes accessing an image stored in an image library of the client device and encoding the image using base64 encoding.

17. The method of claim 9, wherein determining the one or more items associated with the one or more optical machine-readable representations of data further comprises:
- transmitting the one or more optical machine-readable representations of data to a third party service, the third party service capable of determining one or more items associated with the one or more optical machine-readable representations of data; and
- receiving the item data indicative of the one or more items.

18. The method of claim 9, wherein the one or more optical machine-readable representations of data are one or more barcode.

19. A non-transitory machine-readable storage medium comprising processor executable instructions that, when executed by a processor of a server machine, cause the server machine to perform operations comprising:
- receiving, at a server machine, a selection request indicating selection of a user interface element from a client device prompting a server response, the server machine being remote from the client device and communicating with the client device via a communications network;
- based on the selection request, causing, by the server machine, the client device to access an image capture application;
- in response to an image being captured by the client device, causing, by the server machine, the client device to determine a characteristic set of the image to selectively modify one or more attributes of one or more optical machine-readable representations of data included in the image;
- receiving, at the server machine, encoded image data from the client device, the encoded image data being representative of at least a portion of the image including the one or more optical machine-readable representations of data, the encoded image data comprising a character string representing the portion of the image including the one or more optical machine-readable representations of data, the character string configured for intact transmission from the client device to the server machine;
- decoding, by the server machine, the image data to retrieve the one or more optical machine-readable representations of data;
- determining one or more items associated with the one or more optical machine-readable representations of data; and
- causing presentation of item data representative of the one or more items at the client device.

20. The non-transitory machine-readable storage medium of claim 19, wherein determining one or more items associated with the one or more optical machine-readable representations of data further comprises:
- transmitting the one or more optical machine-readable representations of data to a third party service, the third party service capable of determining one or more items associated with the one or more optical machine-readable representations of data; and
- receiving the item data indicative of the one or more items.

\* \* \* \* \*